(12) United States Patent
Franta

(10) Patent No.: US 9,103,408 B1
(45) Date of Patent: Aug. 11, 2015

(54) SOFT SNATCH BLOCK

(76) Inventor: John E. Franta, Mesa, AZ (US)

( * ) Notice: Subject to any disclaimer, the term of this patent is extended or adjusted under 35 U.S.C. 154(b) by 407 days.

(21) Appl. No.: 13/506,228

(22) Filed: Apr. 5, 2012

Related U.S. Application Data

(60) Provisional application No. 61/516,533, filed on Apr. 5, 2011.

(51) Int. Cl.
*F16G 11/00* (2006.01)
*F16G 11/14* (2006.01)

(52) U.S. Cl.
CPC .............. *F16G 11/14* (2013.01); *Y10T 24/3916* (2015.01)

(58) Field of Classification Search
CPC ........... F16G 11/00; F16G 11/14; B66C 1/18; B66C 1/12
USPC ............ 24/115 R, 129 R, 128, 132 R, 115 H, 24/115 K; 254/398, 400, 402, 405, 406, 254/415; 114/109–115, 204, 205, 213, 215, 114/216, 217, 223; 294/74, 82.14
See application file for complete search history.

(56) References Cited

U.S. PATENT DOCUMENTS

| | | | | |
|---|---|---|---|---|
| 1,651,081 A * | 11/1927 | Bardon | ............................ | 294/74 |
| 1,720,069 A * | 7/1929 | Yeaton | ............................. | 294/74 |
| 2,828,156 A * | 3/1958 | Hansen | ............................. | 294/74 |
| 2,905,993 A * | 9/1959 | Wernsing et al. | .......... | 294/82.14 |
| 3,058,184 A * | 10/1962 | Ritzheimer | ................. | 24/115 R |
| 3,175,264 A * | 3/1965 | Maras | ......................... | 294/82.14 |
| 3,237,259 A * | 3/1966 | Maras | ......................... | 24/115 R |
| 3,239,900 A * | 3/1966 | Bottoms | ..................... | 24/115 R |
| 3,683,465 A * | 8/1972 | Wernsing | .................... | 24/115 R |
| 4,055,365 A * | 10/1977 | Kucherry | .................... | 294/82.14 |
| 4,540,209 A * | 9/1985 | Cody | ............................... | 294/74 |
| 6,152,060 A * | 11/2000 | Steiner | .......................... | 114/219 |
| 7,086,803 B2 * | 8/2006 | Ackerman et al. | ............. | 403/210 |
| 7,426,816 B1 * | 9/2008 | Richards | ........................... | 54/85 |
| 2008/0236112 A1 * | 10/2008 | Richards | ........................... | 54/24 |
| 2010/0038611 A1 * | 2/2010 | Lambourn et al. | .............. | 256/53 |

* cited by examiner

*Primary Examiner* — Robert J Sandy
*Assistant Examiner* — Rowland Do
(74) *Attorney, Agent, or Firm* — Ronald R. Kilponen

(57) ABSTRACT

A soft snatch block is shown and described as having a loop of spliced line or soft shackle attached to a block. The soft shackle can be opened or released such that the line can be captured without having one end of the captured line. The block can retain a line to a fixed object to hold a line near the fixed object. A retainer can be used to hold the soft shackle to the block and an alternative embodiment of the block shows a pin to retain the line to the block when the soft shackle is not fixed. The device can be easily attached and removed from any desired location and has no moving parts that require any difficult maintenance. The block has smooth surfaces such that there is a low coefficient of friction while the line is drawn in or released.

8 Claims, 7 Drawing Sheets

SOFT SNATCH BLOCK

CROSS REFERENCE TO RELATED APPLICATIONS

This application claims the benefit of Provisional application for Patent Ser. No. 61/516,533 filed on Apr. 5, 2011

FIELD

The present version of these embodiments relate generally to the field of devices used to grab, hold or retain lines while allowing the line being held to be let out or hauled in.

BACKGROUND

These embodiments relate to devices that grab and retain a line to a boat or other fixed device and more particularly to devices that will retain the line and allow the line to be hauled in or released commonly called snatch blocks. Snatch blocks have been used for many years in the boating industry and are particularly handy on sailing vessels or on other vessels where it necessary to temporarily hold or secure a line to the boat. Snatch blocks are also used in many other industries for pulling a rope or line or in using a rope or line for lifting. In many cases the line needs to be secured to the boat while allowing the line secured to be let out or hauled in. Dependent upon the vessel and weather conditions it may be necessary to secure this line to different positions on the vessel and this necessitates having several snatch blocks located in various positions or requires moving a snatch block to the desired position on the vessel to retain the line. Many times it is necessary to grab a line and affix it to various locations. The snatch block must be opened such that the line can be inserted in the block without having the end of the line available.

While these examples may be directed to sailing vessels it should be recognized that this device can be used in any industry or for any purpose in which a line is used to pull or lift.

Traditional snatch blocks have a frame to which is affixed a wheel that rotates when a line is wrapped around the wheel. There is also some type of attachment system to secure the wheel and frame to the vessel. Some blocks have bearings and others do not but generally snatch blocks are heavy, expensive and because some have bearings, can be maintenance intensive.

When the snatch blocks are not in use they may need to be removed and stored because they can flop around their attachment point making noise and causing damage. Dependent upon the vessel used, weather conditions and rigging, several snatch blocks may be attached or installed and removed as needed.

The traditional snatch blocks are heavy, expensive, can cause damage to the vessel when attached while not being used and can also require maintenance. There is a need for a soft snatch block with no moving parts.

For the foregoing reasons, there is a need for a soft snatch block that could be easily removed and re-attached as needed, is light in weight, strong and has no moving parts and does not require the same maintenance as traditional snatch blocks.

SUMMARY

In view of the foregoing disadvantages inherent in the field of traditional snatch blocks there is a need for a soft snatch block.

A first objective of these embodiments is to provide a device that is relatively light in weight.

Another objective of these embodiments is to provide a device that can be easily installed and removed relatively quickly from one desired location to another.

It is yet another objective of these embodiments to provide a device that will require little maintenance.

Another objective of this device is to allow the user to grab a line and insert it into the snatch block without having the end of the line available.

It is a still further object of these embodiments to provide a device that has good strength to weight ratio compared to the devices in the background art.

These together with other objectives of these embodiments, along with various features of novelty which characterize these embodiments, are pointed out with particularity in this application forming a part of this disclosure. For a better understanding of these embodiments, the operating advantages and the specific objectives attained by its uses, reference should be had to the accompanying drawings and descriptive matter in which there is illustrated a preferred embodiment.

DETAILED DESCRIPTION OF THE PREFERRED EMBODIMENTS

Figure 1:
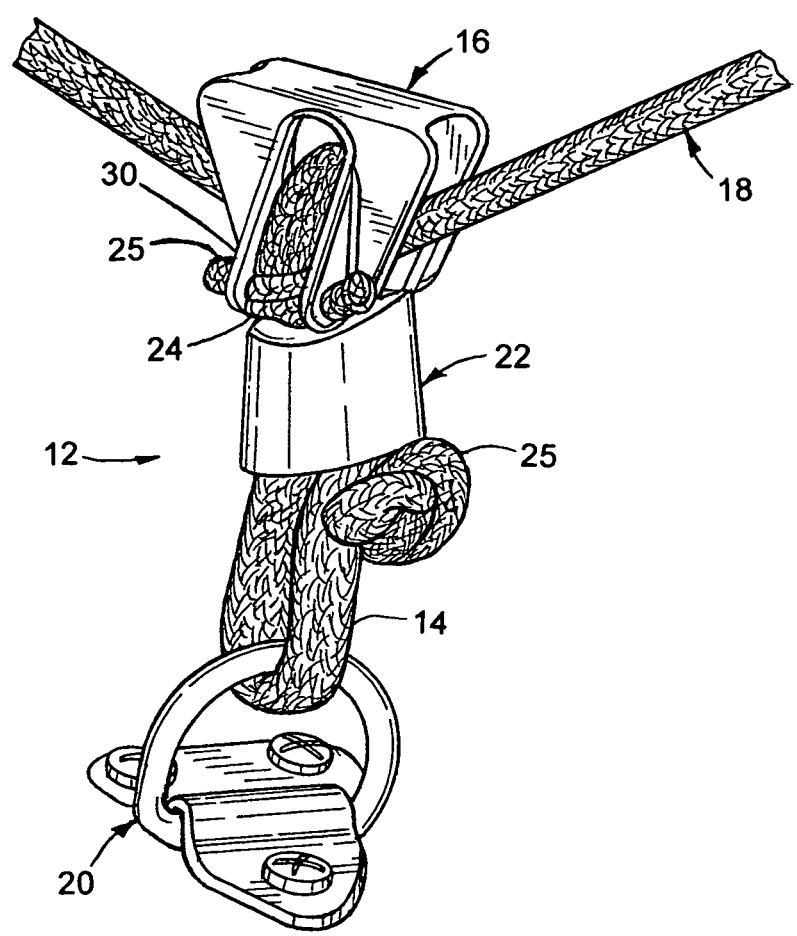
FIG. 1 shows a perspective view of one embodiment of a snatch block attached to a ring or fixed point.

Referring to the drawings in detail wherein like elements are indicated by like numerals, there is shown in FIG. 1 a soft snatch block 12. The soft snatch block 12 has a block 16 attached to a soft shackle 14. The soft shackle is a piece of line that has been spliced to include a loop (not shown) and a knot 25. A hook and loop 22 fastener is also affixed to the soft shackle 14, see FIG. 2.

Figure 2:
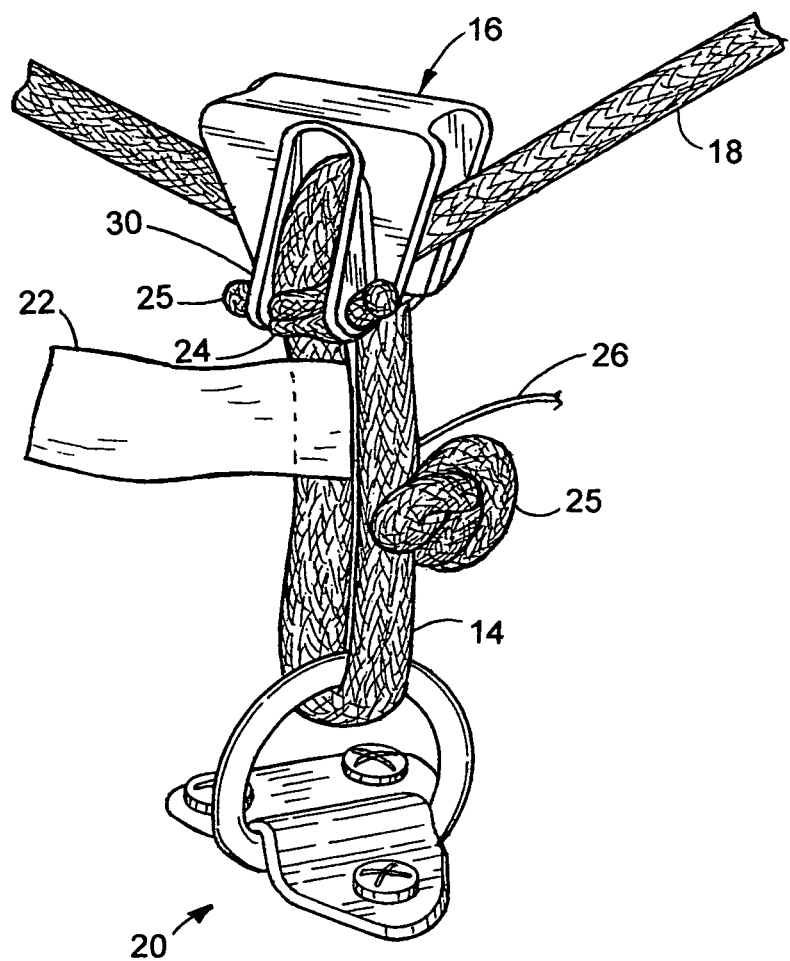
FIG. 2 shows a perspective view of a soft snatch block attached to a ring or fixed point with the hook and loop detached to show details of the soft shackle.

FIG. 2 shows the hook and loop 22 in the detached position. The hook and loop 22 is affixed at one end to the soft shackle 14 with stitching. There is a leash 26 on the loop of the soft shackle 14. The leash 26 is pulled to open up the loop which allows the knot 25 to be inserted and removed from the loop. This is what keeps the soft shackle 14 together.

To insert a line 18 into the soft snatch block 12 the user would unwind the hook and loop 22, pull the leash 26 to open the loop and remove the knot 25 from the loop. This allows the line 18 to be inserted into the block 16. The knot 25 is then inserted back into the loop and the leash 26 eased up to the knot 25 securing the line 18 in the block 16. One big advantage to this soft snatch block 12 is that a user does not need to insert the end of the line into the block 16, but can open the soft shackle 14 and capture the line 18 anywhere along the length of the line 18.

FIG. 1 shows the soft snatch block 12 affixed to a fixed point 20. In this figure, the fixed point 20 is a loop and connector attached to a surface. It should be recognized that this soft snatch block 12 can be attached to anything that the soft shackle 14 can fit through.

Figure 3:
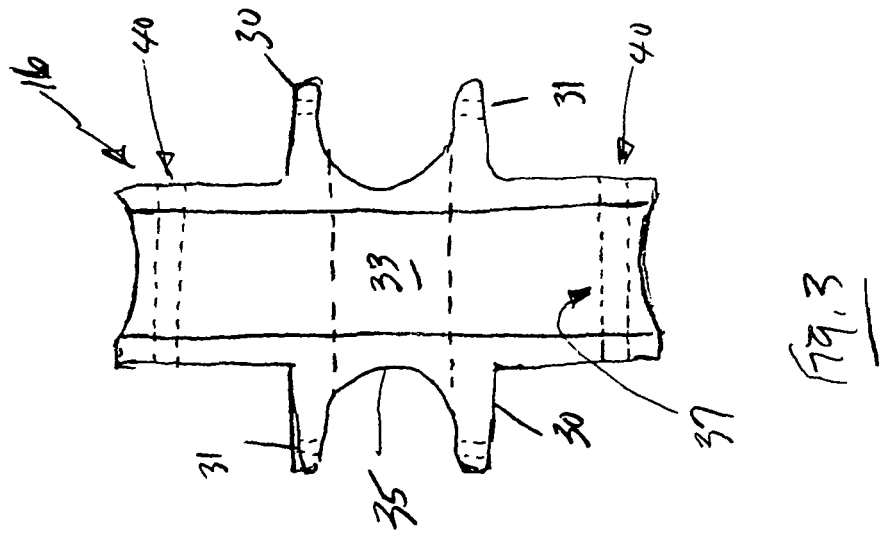
FIG. 3 shows a bottom view of one embodiment of a block.
Figure 7:
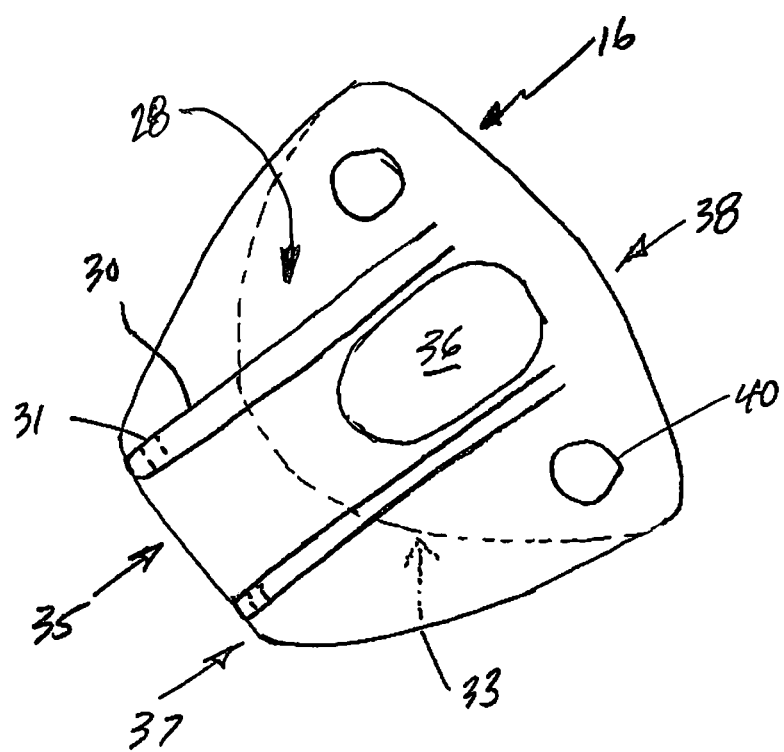
FIG. 7 shows a view of the first face of one embodiment of a block.

FIG. 3 shows the bottom 37 of the block 16. From this figure, one can see the line slot 33 that is located between a pair of ears 30 one pair on each side. FIG. 7 shows the line slot 33 in a different view. The ears 30 each have holes 31 through which a retainer 24 can be inserted. The retainer 24 is fed through each one of a pair of ears 30 with a knot 25 placed on each end. This retainer 24 secures the soft shackle 14 to the block 16, best seen in FIGS. 1,2. The retainer 24 can also be threaded thru the soft shackle 14 to better retain the soft shackle 14. Alternatively, the retainer 24 can be looped around the soft shackle 14 between the two ears, FIG. 1.

Figure 4:
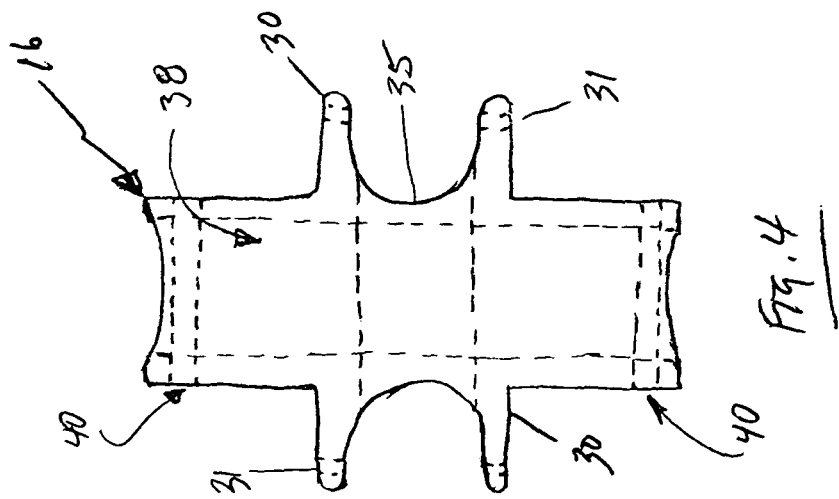
FIG. 4 shows a top view of one embodiment of a block.

FIG. 4 shows the top 38 of the block 16. Also shown in FIGS. 3, 4 and 7 is relief hole 40. The relief hole 40 is drilled into the larger blocks 16 to reduce the weight of the block and make the soft snatch block easier to handle.

Figure 5:
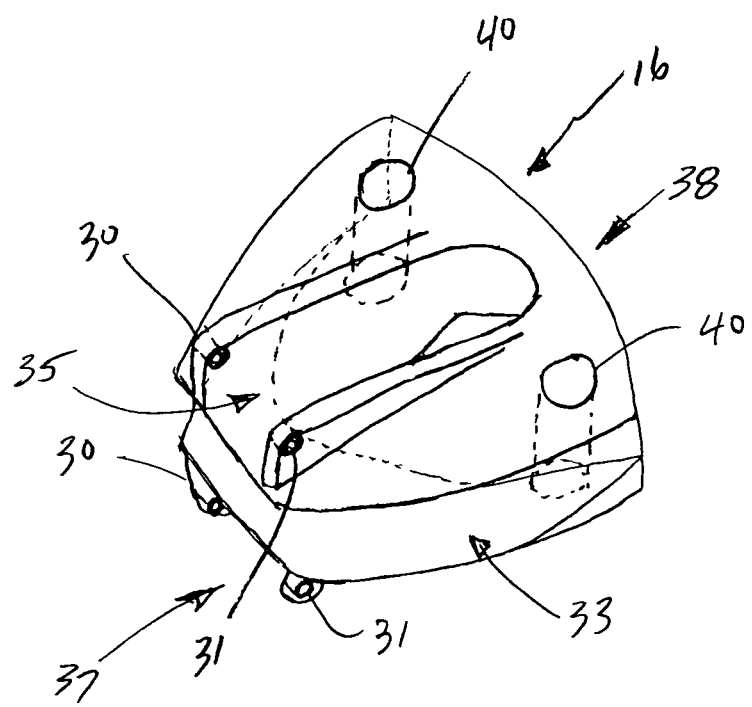
FIG. 5 shows a perspective view of one embodiment of a block.

FIG. 5 shows a perspective view of one embodiment of the block 16. The shackle slot 35 is shown along with the line slot 33. The ears 30 are clearly shown where there are one pair of ears 30 on each side of the line slot 33. Each of the ears has a hole 31 to insert the retainer 24 to hold the soft shackle 14 to the block 16. The line slot 33 is curved to allow the line 18 to wrap around the block 16 while not compressing the fibers on the inside of the curve beyond the damage limit of the line material. Blocks 16 for different diameter line would have larger or smaller radii to line slot 33, obviously the larger the line diameter the larger the radii and the smaller the line, the smaller the radii.

Figure 6:
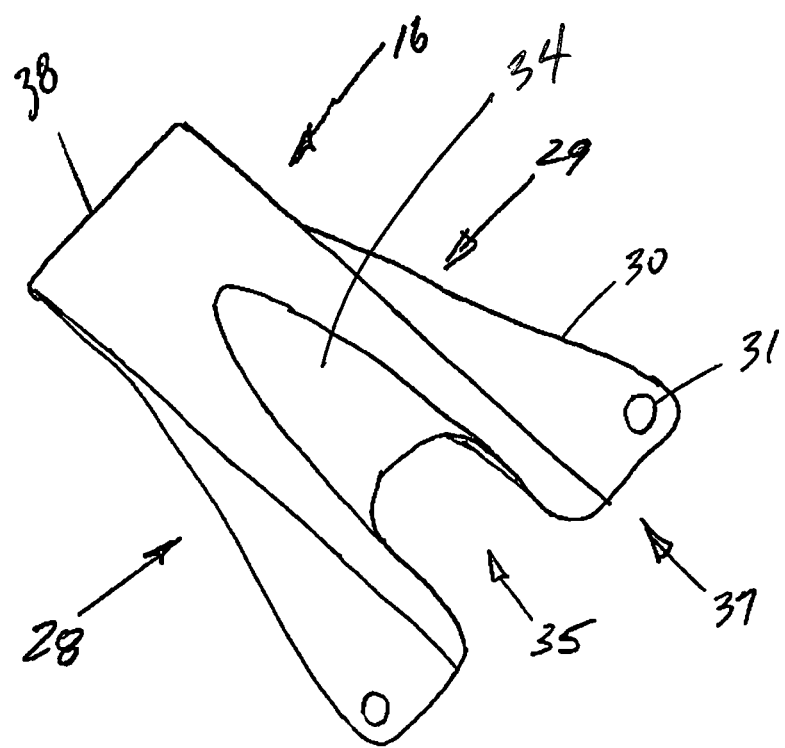
FIG. 6 shows a side view of one embodiment of a block.

FIG. 6 shows a side view of one embodiment of the block 16. The smooth surface of the shackle slot 35 and taper 34 can clearly be seen in this view.

FIG. 7 shows a view of the first face 28 of one embodiment of the block 16.

Figure 8:
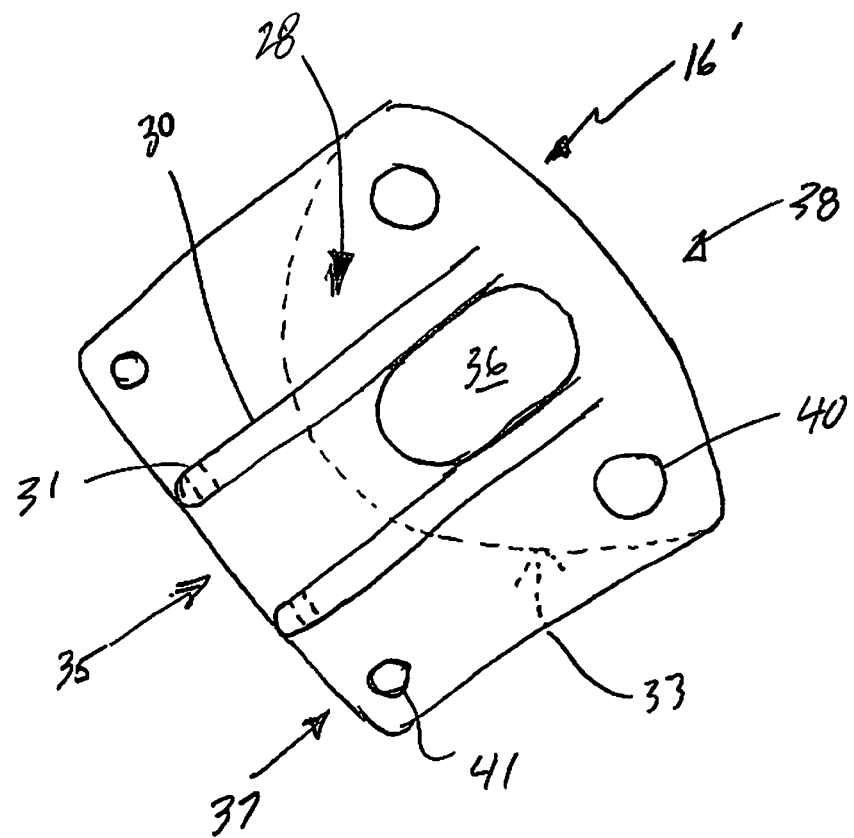
FIG. 8 shows a view of the first face of an alternative embodiment of the block with the addition of pin holes.

FIG. 8 shows a view of the first face 28 of another embodiment of the block 16. In this embodiment there is additional material added to the first face 28 of the block 16 and there are pin holes 41 drilled through to the second face 29 of block 16. The pin holes can be used to insert a removable pin (not shown). This removable pin can be used to retain the line 18 in the block when the soft shackle 14 is disconnected. This would allow the soft snatch block 12 to be removed and then affixed at another location and the line 18 would remain affixed to the block 16.

This embodiment also shows relief holes 40 and it should be understood that based on the size of the block 16 these relief holes 40 might not need to be included for weight loss. In summary, the block 16 may or may not have relief holes 40 and may or may not have pin holes 41.

It should be understood that the length of the soft shackle 14 could be increased or decreased dependent upon the user's needs. While these embodiments show a block 16 affixed by a soft shackle 14 it should be understood that only the block could be used with a lashing in place of the soft shackle 14.

It will now be apparent to those skilled in the art that other embodiments, improvements, details and uses can be made consistent with the letter and spirit of the foregoing disclosure and within the scope of this application, which is limited only by the following claims, construed in accordance with the patent law, including the doctrine of equivalents.

What is claimed is:

1. A device for removably affixing a moveable line to a fixed point, the device comprising:
   a block having a first face, a second face, a top and a bottom;
   the block having a u-shaped line slot opening towards the top of the block and parallel to the first and second face, a u-shaped shackle slot, the shackle slot opening towards the bottom of the block and perpendicular to the first and second face, the shackle slot and the line slot interconnecting one another and offset by approximately ninety degrees;
   the line slot has a radial profile, the shackle slot has a radial profile;
   one ear on each side of the shackle slot near the bottom of the first face, one ear on each side of the shackle slot near the bottom of the second face, a hole through each ear co-linear with the hole on the ear on the same face;
   a retainer inserted into the hole of one ear of the first face and through the hole in an opposite ear, a knot tied in each end of the retainer; and
   a second retainer inserted into the hole of one ear of the second face and through the hole in the opposite ear, a knot tied on each end of the retainer.

2. The device of claim 1, further comprising:
   a relief hole near the end of the line slot from the first face to the second face, a second relief hole near the end of the line slot from the second face to the first face whereby each of the relief holes remove material to reduce weight of the device.

3. The device of claim 1, further comprising:
   a soft shackle threaded through the shackle slot;
   one end of each retainer untied and threaded around the soft shackle and retied; and
   a hook and loop fastener attached to the soft shackle.

4. The device of claim 1, further comprising:
   a soft shackle threaded through the shackle slot;
   one end of each retainer untied and threaded through the soft shackle and retied; and
   a hook and loop fastener attached to the soft shackle.

5. A device for removably affixing a moveable line to a fixed point, the device comprising:
   a block having a first face, a second face, a top and a bottom;
   the block having a u-shaped line slot opening towards the top of the block and parallel to the first and second face, a u-shaped shackle slot, the shackle slot opening towards the bottom of the block and perpendicular to the first and second face, the shackle slot and the line slot interconnecting one another and offset by approximately ninety degrees;
   the line slot has a radial profile, the shackle slot has a radial profile;
   one ear on each side of the shackle slot near the bottom of the first face, one ear on each side of the shackle slot near the bottom of the second face, a hole through each ear co-linear with the hole on the ear on the same face;
   one pin hole through the first face and second face near the bottom outside of one ear and a second pin hole through the first face and second face near the bottom and outside of the opposite ear whereby one or both pin holes can house a quick release pin for retaining the line in the block;
   a retainer inserted into the hole of one ear of the first face and through the hole in an opposite ear, a knot tied in each end of the retainer; and
   a second retainer inserted into the hole of one ear of the second face and through the hole in the opposite ear, a knot tied on each end of the retainer.

6. The device of claim 5, further comprising:
a relief hole near the end of the line slot from the first face to the second face, a second relief hole near the end of the line slot from the second face to the first face whereby each of the relief holes remove material to reduce weight of the device.

7. The device of claim 5, further comprising:
a soft shackle threaded through the shackle slot;
one end of each retainer untied and threaded around the soft shackle and retied; and
a hook and loop fastener attached to the soft shackle.

8. The device of claim 5, further comprising:
a soft shackle threaded through the shackle slot;
one end of each retainer untied and threaded through the soft shackle and retied; and
a hook and loop fastener attached to the soft shackle.

\* \* \* \* \*